(12) United States Patent
Oh

(10) Patent No.: US 6,880,661 B1
(45) Date of Patent: Apr. 19, 2005

(54) DETACHABLE MOTOR DRIVE FOR A BICYCLE

(76) Inventor: Steve Oh, 1207 3rd Ave., Los Angeles, CA (US) 90019

(*) Notice: Subject to any disclaimer, the term of this patent is extended or adjusted under 35 U.S.C. 154(b) by 0 days.

(21) Appl. No.: 10/787,868

(22) Filed: Feb. 26, 2004

(51) Int. Cl.$^7$ ................................................ B62M 7/04
(52) U.S. Cl. ............................ 180/205; 180/15; 180/16
(58) Field of Search ........... 180/15–16, 205.11–205.13, 180/65.1, 206; 280/202–204, 288.4

(56) References Cited

U.S. PATENT DOCUMENTS

| | | | | |
|---|---|---|---|---|
| 3,312,299 A | * | 4/1967 | Kuecker | 180/11 |
| 3,767,000 A | * | 10/1973 | Smith | 180/16 |
| 3,905,437 A | * | 9/1975 | Kaiho et al. | 180/15 |
| 4,413,692 A | * | 11/1983 | Clifft | 180/11 |
| 5,141,067 A | * | 8/1992 | Diggs | 180/11 |
| 5,222,567 A | * | 6/1993 | Broadhead et al. | 180/15 |
| 5,491,390 A | | 2/1996 | McGreen | 318/5 |
| 5,671,821 A | | 9/1997 | McGreen | 180/220 |
| D434,349 S | | 11/2000 | Currie et al. | D12/111 |
| 6,155,369 A | | 12/2000 | Whittaker | 180/220 |
| 6,290,014 B1 | * | 9/2001 | MacCready, Jr. | 180/205 |
| 6,502,842 B2 | * | 1/2003 | Ko | 280/215 |
| 6,516,911 B1 | | 2/2003 | Mayer et al. | 180/220 |
| 2002/0027026 A1 | | 3/2002 | Hong | 180/65.2 |

FOREIGN PATENT DOCUMENTS

DE           3303525 A1 *   8/1984     ........... B62K/11/00

* cited by examiner

*Primary Examiner*—Avraham Lerner
(74) *Attorney, Agent, or Firm*—Park & Sutton LLP; John K. Park

(57) ABSTRACT

A motor drive for a bicycle is provided. The motor drive includes a drive wheel and a motor device driving the drive wheel. The drive wheel contacts the ground and moves the bicycle by rotating friction between the drive wheel and the ground. The motor device includes a fixing portion that attaches the motor device to the frame of the bicycle, and a driving portion that holds the drive wheel and drives the drive wheel. The driving portion is pivotable with respect to the fixing portion between a parking state and a driving state. The drive wheel is spaced from the ground in the parking state, and contacts the ground in the driving state.

15 Claims, 5 Drawing Sheets

DETACHABLE MOTOR DRIVE FOR A BICYCLE

BACKGROUND OF THE INVENTION

The present invention relates to a detachable motor drive for a bicycle. More particularly, this invention relates to a detachable motor drive for a bicycle, which is easy to attach to or detach from a bicycle, and does not interfere with the drive train of the bicycle.

Many motor drive devices, which aid driving a humanpower-driven bicycle, have been developed. Such devices use an electric motor, or a small gasoline engine to provide driving force to a bicycle. Such devices are useful when riding on a bicycle on an inclined road, or riding on a bicycle for a long distance.

As an example of motor drive for a bicycle, U.S. Pat. No. 5,491,390 to McGreen discloses an electric propulsion system for a bicycle, which includes an electric motor secured to a mounting assembly, a drive roller that impinges on the front wheel of the bicycle, and a battery pack secured to the frame of the bicycle.

U.S. Pat. No. 6,155,369 to Whittaker discloses an electric bicycle, which includes a DC motor, a clutch, and drive circuitry. The motor's driving power is transferred to the rear wheel of the bicycle via a chain or V-belt transmission.

U.S. Pat. No. Des. 434,349 to Currie et al. discloses an electric bicycle with pedal torque enable unit, which includes a battery unit carried in the triangular space between the frames of the bicycle, and a motor that engages with the sprocket wheel of the rear wheel.

U.S. Pat. No. 6,516,911 to Mayer et al. discloses a unitary power module for electric bicycles, which includes a target sprocket that can be attached to the axle of either the front wheel or the rear wheel, and a pinion sprocket that engages with the target sprocket, and is driven by a motor.

U.S. Patent Application Publication No. US2002/0027026 to Hong discloses an automatic transmission for electric bicycle, which includes a motor, a friction wheel that engages with the rear wheel of a bicycle, a power-transmitting device, and an electronic gearshift device.

Disadvantages of motor drives for a bicycle by prior art are that they include many parts and thus are expensive; that they are integrated with the manual drive train of the bicycle, or engage with either wheel of the bicycle, and thus are difficult to install or uninstall; and that they are usually positioned in the middle of or in the upper part of the bicycle, and thus it is hard to balance the bicycle since the center of gravity is high.

SUMMARY OF THE INVENTION

The present invention contrives to solve the disadvantages of the prior art.

An objective of the invention is to provide a simple motor drive that can be easily attached to or detached from a bicycle.

Another objective of the invention is to provide a motor drive that is completely separate from the drive train so that the motor drive can be attached to an ordinary bicycle without special accommodation.

Still another objective of the invention is to provide a motor drive that can be easily detached from a bicycle when it is not used.

Still another objective of the invention is to provide a motor drive that can be activated or deactivated by one simple operation of the bicycle rider;

Still another objective of the invention is to provide a motor drive that is attached to the bicycle near the ground so that the center of gravity of the entire bicycle is low.

To achieve the above objectives, the present invention provides a motor drive for a bicycle. The bicycle includes a frame, a front wheel and a rear wheel rotatably attached to the frame, a sprocket wheel attached to the frame and two pedals that rotate the sprocket wheel. The motor drive includes a drive wheel and a motor device driving the drive wheel. The drive wheel contacts the ground and moves the bicycle by rotating friction between the drive wheel and the ground.

The motor device includes a fixing portion that attaches the motor device to the frame of the bicycle, and a driving portion that holds the drive wheel and drives the drive wheel. The driving portion is pivotable with respect to the fixing portion between a parking state and a driving state. The drive wheel is spaced from the ground in the parking state. The drive wheel contacts the ground in the driving state.

The driving portion includes a driving motor, a body holding the driving motor, and an extension that extends from the body and rotationally supports the drive wheel. The extension of the driving portion and the drive wheel are positioned below the sprocket wheel of the bicycle when the motor drive is attached to the bicycle. The extension and the drive wheel are narrow enough so that the extension and the drive wheel do not interfere with the pedals of the bicycle.

Alternatively, the driving portion include a body rotationally supports the drive wheel, and the drive wheel includes a driving motor that is contained inside the drive wheel.

The fixing portion includes a fist half and a second half. The first half includes a first groove, and the second half includes a second groove. The first groove and the second groove contact the frame of the bicycle and the first half and the second half are tightened with each other when the fixing portion is fixed to the frame of the bicycle.

The driving motor of the driving portion includes an electric motor. The body of the driving portion is attached to the first half of the fixing portion. A battery is provided for supplying electric power to the electric motor, and the battery is attached to the second half of the fixing portion.

The body of the driving portion includes a first projection and the first half of the fixing portion includes a first slot slidingly receiving the first projection so that the driving portion is assembled with the fixing portion by sliding the first projection into the first slot. The battery includes a second projection and the second half of the fixing portion includes a second slot slidingly receiving the second projection so that the battery is assembled with the fixing portion by sliding the second projection into the second slot.

The motor drive further includes an actuator. The actuator pivots the driving portion between the parking state and the driving state. The actuator includes a cable that is connected to the driving portion, and a winch that wind or unwind the cable.

The motor drive includes a sensor device. The sensor device senses whether the driving portion is in the parking state or in the driving state. The winch of the actuator is stopped when pivoting of the driving portion to the driving state, or to the parking state is completed.

The sensor device includes a first sensor and a second sensor. The first sensor is positioned so that the driving portion contacts the first sensor when the driving portion is pivoted to the driving state. The second sensor is positioned so that the driving portion contacts the second sensor when the driving portion is pivoted to the parking state.

The motor drive further includes a pressing device that presses the drive wheel to the ground when driving portion is pivoted to the driving state. The pressing device is a tension spring having a first end and a second end. The first end is attached to the fixing portion, and the second end is attached to the driving portion.

The motor drive further includes an operation switch that is installed on a handle of the bicycle. The operation switch controls start, stop and speed of the electric motor.

The motor drive may also include a stop switch that is installed on a handle of the bicycle. When a brake of the bicycle is operated, the stop switch disconnects electricity to the electric motor.

The use of the motor drive is not limited to a bicycle. The motor drive can be attached to any human-power driven vehicle that has a frame and wheels, which are rotatably attached to the frame.

The advantages of the present invention are: (1) a simple, light motor drive attachable to a bicycle without altering the structure of the bicycle is provided; (2) the motor drive can be temporarily retracted with simple operation so that conversion between human power driving and motor driving may easily performed; (3) the motor drive is installed at a low position and without interfering with pedals or other moving parts of a bicycle; (4) the motor drive is very compact so that it can be installed on a children's bicycle; and (5) the motor drive is deactivated synchronously with braking of a bicycle.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 1 is an elevation view showing a motor drive of the present invention with a bicycle that the motor drive is attached to;

DETAILED DESCRIPTION OF THE INVENTION

Figure 1:
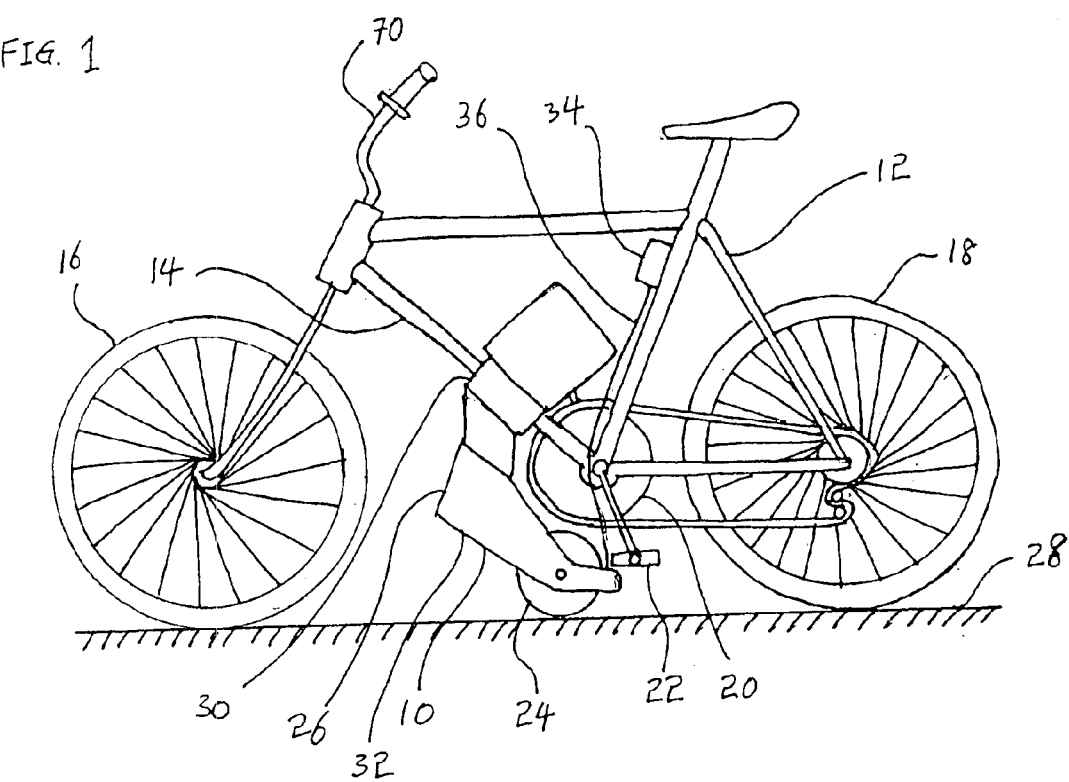

FIG. 1 shows a motor drive 10 for a bicycle 12 according to the present invention. The bicycle 12 includes a frame 14, a front wheel 16 and a rear wheel 18 that are rotatably attached to the frame 14, a sprocket wheel 20 attached to the frame 14 and two pedals 22 that rotate the sprocket wheel 20. The motor drive 10 includes a drive wheel 24 and motor device 26 that drives the drive wheel 24. The drive wheel 24 contacts the ground 28 and moves the bicycle 12 by rotating friction between the drive wheel 24 and the ground 28.

Figure 2:
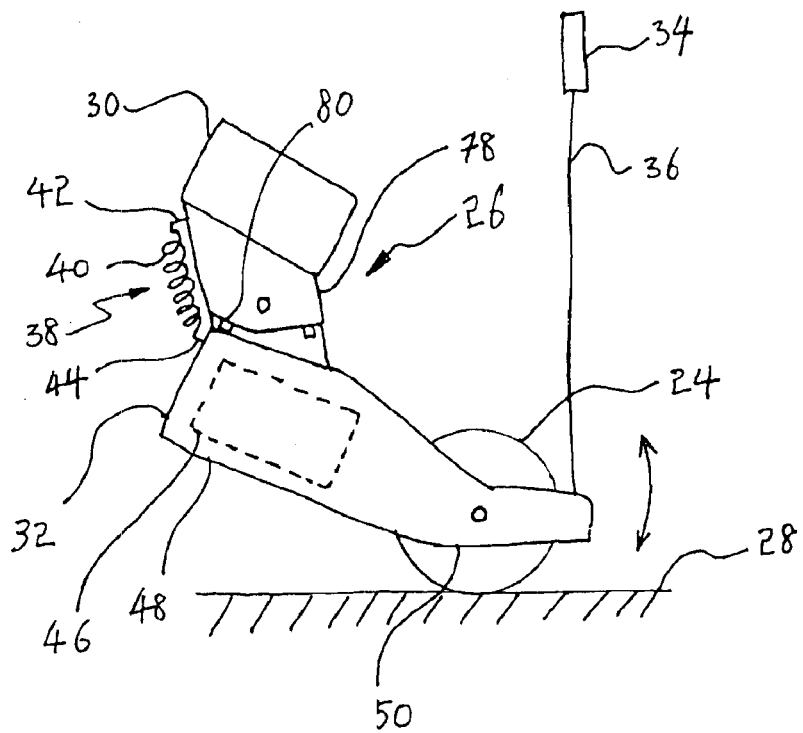
FIG. 2 is an elevation view showing a motor device that drives a drive wheel.

FIG. 2 shows that the motor device 26 includes a fixing portion 30 that attaches the motor device 26 to the frame 14 of the bicycle 12, and a driving portion 32 that holds the drive wheel 24 and drives the drive wheel 24. The driving portion 32 is pivotable with respect to the fixing portion 30 between a parking state and a driving state. The drive wheel 24 is spaced from the ground 28 in the parking state. The drive wheel 24 contacts the ground 28 in the driving state.

The motor drive 10 further includes a pressing device 38 that presses the drive wheel 24 to the ground when the driving portion 32 is pivoted to the driving state. The pressing device 38 is a tension spring 40. The tension spring 40 has a first end 42 and a second end 44. The first end 42 is attached to the fixing portion 30, and the second end 44 is attached to the driving portion 32.

The driving portion 32 includes a driving motor 46, a body 48 holding the driving motor 46, and an extension 50 that extends from the body 48 and rotationally supports the drive wheel 24.

Referring back to FIG. 1, the motor drive 10 further includes an actuator 34. The actuator 34 pivots the driving portion 32 between the parking state and the driving state. The actuator 34 includes a cable 36 that is connected to the driving portion 32, and a winch (not shown) that wind or unwind the cable 36. In the driving state, the winch unwinds the cable 36 so that the extension 50 is lowered and the drive wheel 24 contacts the ground. In the parking state, the winch winds the cable 36 against the tension force of the tension spring 40 so that the extension 50 is pivoted upward.

As shown in FIG. 1, the extension 50 of the driving portion 32 and the drive wheel 24 are positioned below the sprocket wheel 20 of the bicycle 12 when the motor drive 10 is attached to the bicycle 12.

Figure 3:
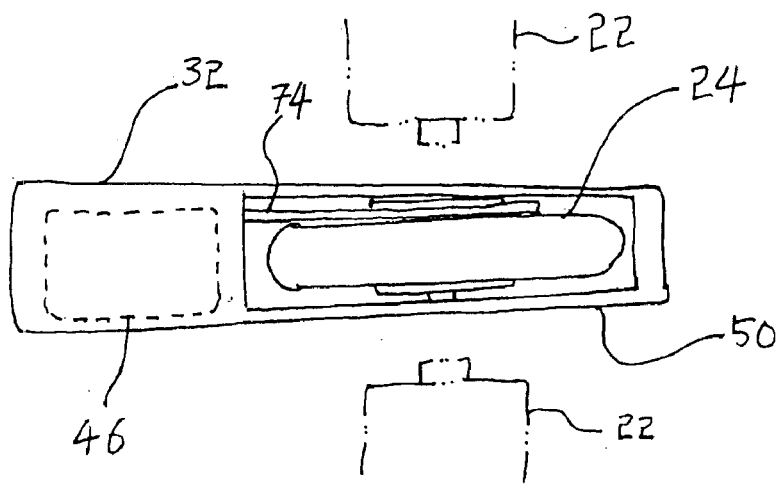
FIG. 3 is a plan view of the motor device.

FIG. 3 shows that the extension 50 and the drive wheel 24 are narrow enough so that the extension 50 and the drive wheel 24 do not interfere with the pedals 22 of the bicycle 12. The drive wheel 24 is driven by the driving motor 46 with a chain 74, etc.

Figure 4:
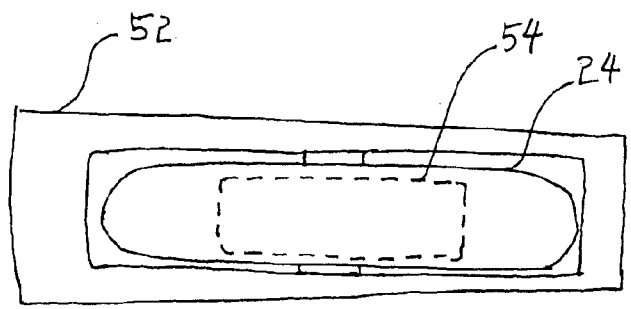
FIG. 4 is an elevation view showing an alternate embodiment of the motor device.

FIG. 4 shows an alternate embodiment. The driving portion 32 includes a body 52 rotationally supports the drive wheel 4. The drive wheel 24 includes a driving motor 54 that is contained inside the drive wheel 24. The body 52 of this embodiment is shorter and more compact than the body 48 of the fist embodiment. The driving motor 54 includes an electric motor that is fitted to be assembled inside the drive wheel 24 and to rotate the drive wheel 24. This embodiment is suitable when available space for attaching the motor drive 10 is limited such as for a children's bicycle.

Figure 5:
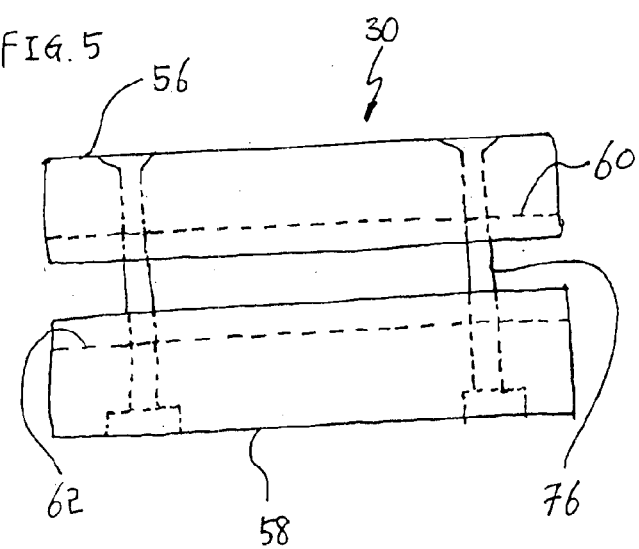
FIG. 5 is an elevation view showing a fixing portion.
Figure 6:
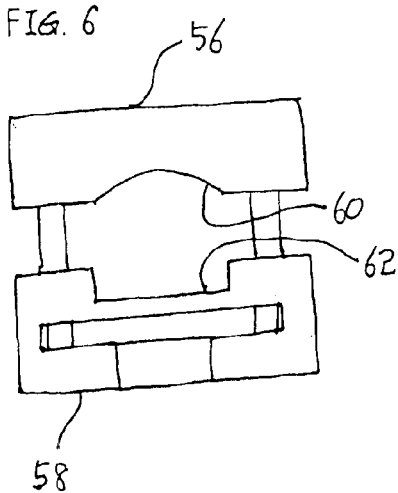
FIG. 6 is a side elevation view of the fixing portion.

FIGS. 5 and 6 show that the fixing portion 30 includes a fist half 56 and a second half 58. The first half 56 includes a first groove 60, and the second half 58 includes a second groove 62. The first groove 60 and the second groove 62 contact the frame 14 of the bicycle 12. The first half 56 and the second half 58 are tightened with each other with bolts 76 when the fixing portion 30 is fixed to the frame 14 of the bicycle 12.

Figure 7:
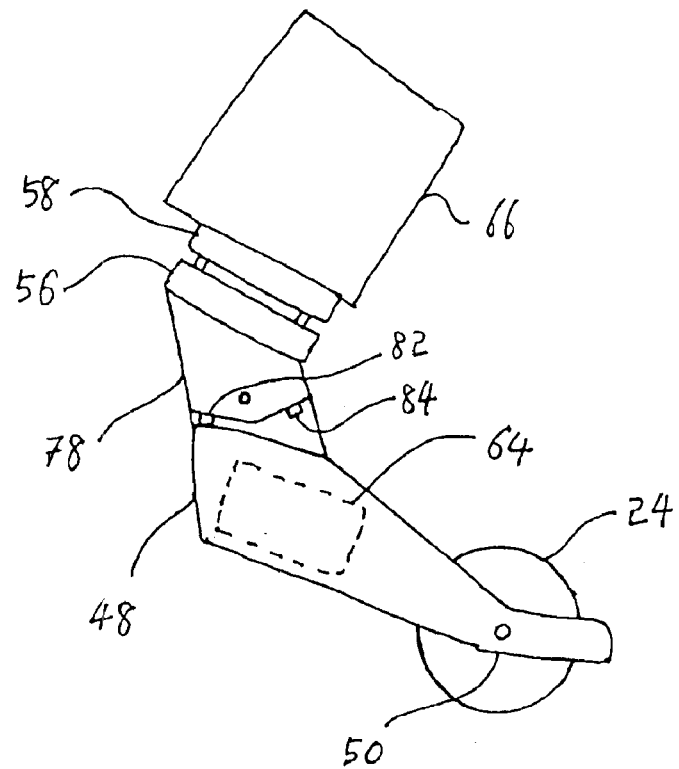
FIG. 7 is an elevation view of the motor device and a battery attached to the motor drive.

FIG. 7 shows that the body 48 of the driving portion 32 is attached to the first half 56 of the fixing portion 30. The driving motor 46 of the driving portion 32 is an electric motor 64, and a battery 66 is provided for supplying electric power to the electric motor 64. The battery 66 is attached to the second half 58 of the fixing portion 30. In this way, the space around the frame 14 of the bicycle 12 is optimally used, and the motor drive 10 is attached to the bicycle 12 at a lowest position. The fixing portion 30 may have a separate pivoting bracket 78 that is detachably attached to the second half 58. The driving portion 32 with the pivoting bracket 78 can be easily removed when the motor drive 10 is not used by detaching the pivoting bracket 78 from the second half 58, and easily attached by attaching the pivoting bracket 78 to the second half 58.

The motor drive 10 further includes a sensor device 80. The sensor device 80 senses whether the driving portion 32 is in the parking state or in the driving state. The winch of the actuator 34 is stopped when pivoting of the driving portion 32 to the driving state, or to the parking state is completed.

The sensor device 80 includes a first sensor 82 and a second sensor 84. The first sensor 82 and the second sensor 84 are positioned between the pivoting bracket 78 and the body 48 of the driving portion 32 so that the driving portion 32 contacts the first sensor 82 when the driving portion 32 is pivoted to the driving state, and the driving portion 32 contacts the second sensor 84 when the driving portion 32 is pivoted to the parking state.

Instead of an electric motor, a gasoline engine may also be used as the driving motor 46 with suitable modifications to be attached to the fixing portion 30.

Figure 8:
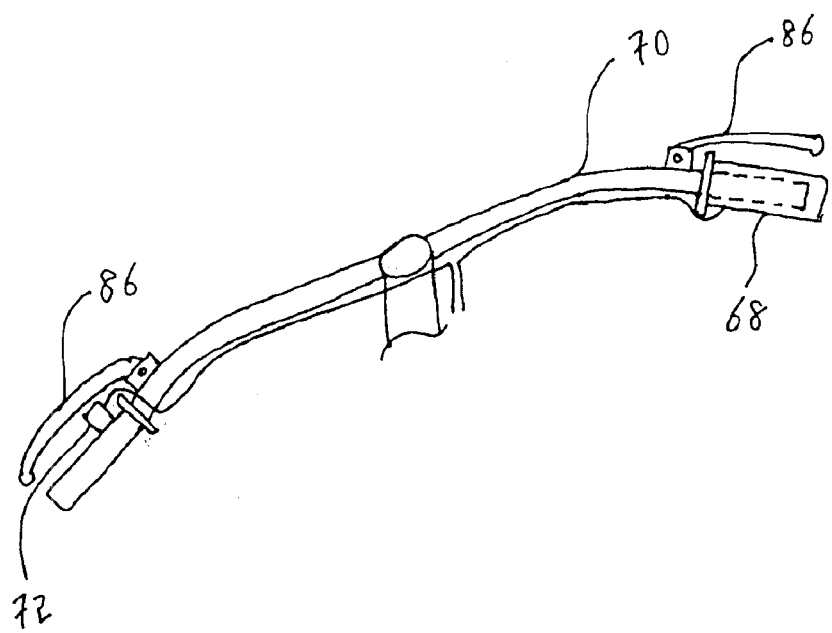
FIG. 8 is an illustrative perspective view showing an operation switch and a stop switch of the motor drive.

FIG. 8 shows that the motor drive 10 further includes an operation switch 68 that is installed on a handle 70 of the bicycle 12. The operation switch 68 controls start, stop and speed of the electric motor 64. A rider of the bicycle 12 grips and rotates the operation switch 68 in order to control the electric motor 64. In order to operate a brake 86 of the bicycle 12, the rider should release the operation switch 68, and the electric motor 64 is automatically stopped.

Figure 9:
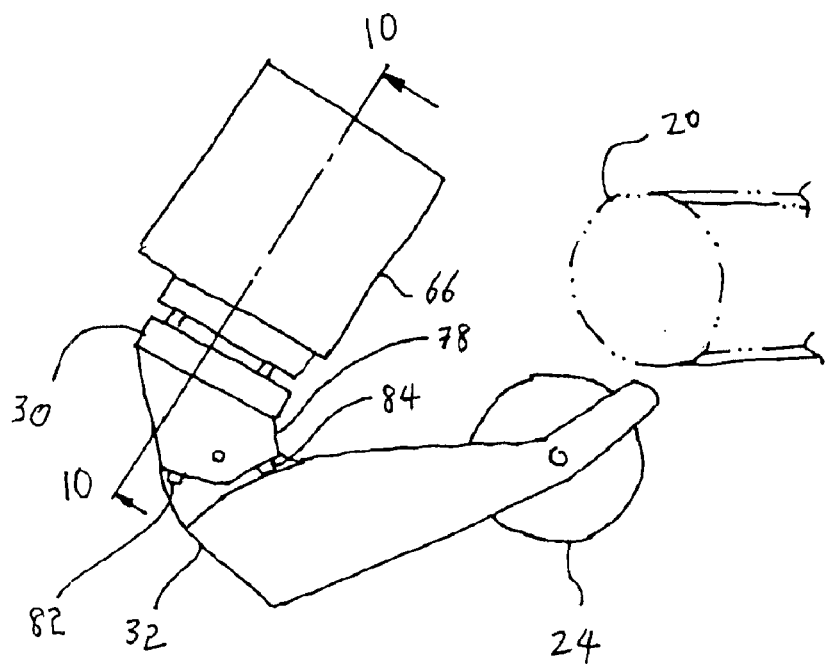
FIG. 9 is an elevation view showing that the driving portion is pivoted to a parking state.

FIG. 9 shows that the driving portion 32 is pivoted to the parking state. Even in the parking state, there is plenty of room between the sprocket wheel 20 of the bicycle. 12 and the drive wheel 24 of the motor drive 10.

Figure 10:
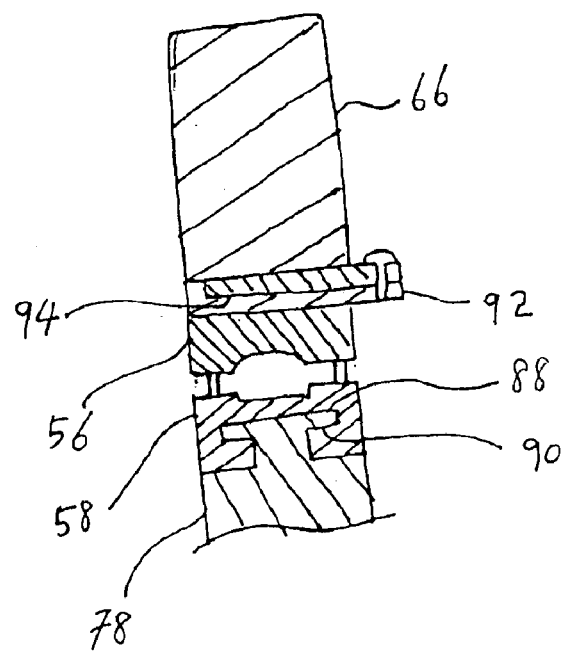
FIG. 10 is a cross-sectional view taken along the line 10—10 in FIG. 9.

FIG. 10 shows how the battery 66 and the driving portion 32 is instantly attached to or detached from the frame 14 of the bicycle 12. The body 48 of the driving portion 32, or the pivoting bracket 78 as shown on FIG. 10 includes a first projection 88, and the first half 56 of the fixing portion 58 includes a first slot 90 slidingly receiving the first projection 88 so that the driving portion 32 is assembled with the fixing portion 30 by sliding the first projection 88 into the first slot 90. The battery 66 includes a second projection 92 and the second half 58 of the fixing portion 30 includes a second slot 94 slidingly receiving the second projection 92 so that the battery 66 is assembled with the fixing portion 30 by sliding the second projection 92 into the second slot 94.

As additional safety measures, the motor drive 10 further includes a stop switch 72 that is installed on the handle 70 of the bicycle 12. When the brake 86 of the bicycle 12 is operated, the stop switch 72 disconnects electricity to the electric motor 64.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A motor drive for a bicycle, wherein the bicycle comprises a frame, a front wheel and a rear wheel rotatably attached to the frame, a sprocket wheel attached to the frame and two pedals that rotate the sprocket wheel, the motor drive comprising:

a) a drive wheel; and
   b) a motor device driving the drive wheel, wherein the drive wheel contacts the ground and moves the bicycle by rotating friction between the drive wheel and the ground, wherein the motor device comprises a fixing portion that attaches the motor device to the frame of the bicycle, and a driving portion that holds the drive wheel and drives the drive wheel, wherein the driving portion is pivotable with respect to the fixing portion between a parking state and a driving state, wherein the drive wheel is spaced from the ground in the parking state, wherein the drive wheel contacts the ground in the driving state.

2. The motor drive of claim 1, further comprising an actuator, wherein the actuator pivots the driving portion between the parking state and the driving state.

3. The motor drive of claim 2, wherein the actuator comprises a cable that is connected to the driving portion, and a winch that winds or unwinds the cable.

4. The motor drive of claim 3, further comprising a sensor device, wherein the sensor device senses whether the driving portion is in the parking state or in the driving state, wherein the winch of the actuator is stopped when pivoting of the driving portion to the driving state, or to the parking state is completed.

5. The motor drive of claim 4, wherein the sensor device comprises a first sensor and a second sensor, wherein the first sensor is positioned so that the driving portion contacts the first sensor when the driving portion is pivoted to the driving state, and wherein the second sensor is positioned so that the driving portion contacts the second sensor when the driving portion is pivoted to the parking state.

6. The motor drive of claim 1, further comprising a pressing device that presses the drive wheel to the ground when the driving portion is pivoted to the driving state.

7. The motor drive of claim 6, wherein the pressing device is a tension spring, wherein the tension spring comprises a first end and a second end, and wherein the first end is attached to the fixing portion, and the second end is attached to the driving portion.

8. The motor drive of claim 1, wherein the driving portion comprises a body rotationally supporting the drive wheel, and wherein the drive wheel comprises a driving motor that is contained inside the drive wheel.

9. The motor drive of claim 1, wherein the driving portion comprises a driving motor, a body holding the driving motor, and an extension that extends from the body and rotationally supports the drive wheel.

10. The motor drive of claim 9, wherein the extension of the driving portion and the drive wheel are positioned below the sprocket wheel of the bicycle when the motor drive is attached to the bicycle, and wherein the extension and the drive wheel are narrow enough so that the extension and the drive wheel do not interfere with the pedals of the bicycle.

11. The motor drive of claim 9, wherein the fixing portion comprises a first half and a second half, wherein the first half comprises a first groove, and the second half comprises a second groove, wherein the first groove and the second groove contact the frame of the bicycle and the first half and the second half are tightened with each other when the fixing portion is fixed to the frame of the bicycle.

12. The motor drive of claim 11, wherein the driving motor of the driving portion comprises an electric motor, wherein the body of the driving portion is attached to the first half of the fixing portion, wherein a battery is provided for supplying electric power to the electric motor, and wherein the battery is attached to the second half of the fixing portion.

13. The motor drive of claim 12, wherein the body of the driving portion comprises a first projection and the first half of the fixing portion comprises a first slot slidingly receiving the first projection whereby the driving portion is assembled with the fixing portion by sliding the first projection into the first slot, and wherein the battery comprises a second projection and the second half of the fixing portion comprises a second slot slidingly receiving the second projection whereby the battery is assembled with the fixing portion by sliding the second projection into the second slot.

14. The motor drive of claim 9, further comprising an operation switch that is installed on a handle of the bicycle, wherein the driving motor of the driving portion comprises an electric motor, wherein operation switch controls start, stop and speed of the electric motor.

15. The motor drive of claim 9, further comprising a stop switch that is installed on a handle of the bicycle, wherein the driving motor of the driving portion comprises an electric motor, wherein when a brake of the bicycle is operated, the stop switch disconnects electricity to the electric motor.

* * * * *